(12) United States Patent
Kaufmann et al.

(10) Patent No.: US 9,168,588 B2
(45) Date of Patent: Oct. 27, 2015

(54) CUTTING INSERT HAVING A COOLANT DUCT

(71) Applicant: Kennametal Inc., Latrobe, PA (US)

(72) Inventors: Igor Kaufmann, Nürnbrg (DE); Anwar Sadat Mohideen Abdul, Nürnberg (DE); Franz Havrda, Grossenseebach (DE)

(73) Assignee: KENNAMETAL INC., Latrobe, PA (US)

(*) Notice: Subject to any disclaimer, the term of this patent is extended or adjusted under 35 U.S.C. 154(b) by 115 days.

(21) Appl. No.: 14/091,381

(22) Filed: Nov. 27, 2013

(65) Prior Publication Data

US 2014/0147219 A1 May 29, 2014

(30) Foreign Application Priority Data

Nov. 29, 2012 (DE) .......................... 10 2012 111 576

(51) Int. Cl.
   *B23B 27/04* (2006.01)
   *B23B 27/10* (2006.01)
   B23B 27/22 (2006.01)

(52) U.S. Cl.
   CPC ............... *B23B 27/10* (2013.01); *B23B 27/045* (2013.01); *B23B 27/04* (2013.01); *B23B 27/22* (2013.01); *B23B 2200/086* (2013.01); *Y10T 407/14* (2015.01); *Y10T 407/24* (2015.01); *Y10T 407/25* (2015.01)

(58) Field of Classification Search
   None
   See application file for complete search history.

(56) References Cited

U.S. PATENT DOCUMENTS

| | | | |
|---|---|---|---|
| 1,707,903 A | 4/1929 | Charlton et al. | |
| 3,894,322 A | 7/1975 | Pano et al. | |
| 4,230,428 A | 10/1980 | Haug et al. | |
| 4,645,385 A | 2/1987 | Keller et al. | |
| 5,161,920 A | 11/1992 | Zinner et al. | |
| 5,375,948 A * | 12/1994 | Lindstedt | 407/116 |
| 5,411,354 A | 5/1995 | Gustafsson | |
| 5,829,924 A | 11/1998 | Oshnock et al. | |
| 5,921,724 A | 7/1999 | Erickson et al. | |
| 5,934,843 A | 8/1999 | Hansson et al. | |
| 6,234,727 B1 | 5/2001 | Barazani | |
| 6,579,044 B1 | 6/2003 | Trenkwalder et al. | |
| 8,827,598 B2 | 9/2014 | Henry et al. | |
| 8,939,684 B2 * | 1/2015 | Chistyakov | 407/117 |
| 2002/0081165 A1 | 6/2002 | Hecht et al. | |
| 2003/0165362 A1 | 9/2003 | Hecht | |
| 2005/0238444 A1 | 10/2005 | Virtanen et al. | |
| 2006/0269367 A1* | 11/2006 | Havrda | 407/117 |
| 2008/0193231 A1* | 8/2008 | Jonsson et al. | 407/11 |
| 2008/0240874 A1* | 10/2008 | Nagaya et al. | 407/113 |
| 2011/0299944 A1* | 12/2011 | Hofermann | 407/11 |
| 2013/0051934 A1* | 2/2013 | Henry et al. | 407/11 |
| 2013/0183109 A1* | 7/2013 | Fujii | 407/100 |

(Continued)

FOREIGN PATENT DOCUMENTS

| AT | 6939 U1 | 6/2004 |
|---|---|---|
| DE | 3319799 A1 | 12/1984 |

(Continued)

OTHER PUBLICATIONS

K-04102-US-NP Non-Final Rejection.

*Primary Examiner* — Daniel Howell
*Assistant Examiner* — Donte Brown
(74) *Attorney, Agent, or Firm* — Larry R. Meenan

(57) ABSTRACT

A cutting insert having a main lip, a rake face and at least one coolant duct, which is formed on the top side of the cutting insert, is disclosed. The at least one coolant duct runs at least partially in the rake face towards the main lip and the width increases towards the main lip.

20 Claims, 3 Drawing Sheets

(56) References Cited

U.S. PATENT DOCUMENTS

| | | | |
|---|---|---|---|
| 2013/0236256 A1* | 9/2013 | Kaufmann et al. | 407/107 |
| 2014/0161547 A1* | 6/2014 | Kaufmann et al. | 407/72 |
| 2014/0321929 A1* | 10/2014 | Bhagath | 407/109 |
| 2015/0075338 A1* | 3/2015 | Onodera | 82/1.11 |

FOREIGN PATENT DOCUMENTS

| | | | | |
|---|---|---|---|---|
| DE | 19739855 A1 | 4/1999 | | |
| DE | 69608965 T2 | 12/2000 | | |
| DE | 699 06 702 T2 | 2/2004 | | |
| DE | 20 2006 011 535 U1 | 11/2006 | | |
| DE | 102006055255 A1 | 11/2006 | | |
| DE | 102012002395 A1 * | 9/2012 | | B23B 29/12 |
| EP | 0865851 A1 | 9/1998 | | |
| EP | 1188503 A1 * | 3/2002 | | B23B 27/04 |
| WO | 2009141815 A1 | 11/2009 | | |
| WO | 2010/096 014 A1 | 8/2010 | | |
| WO | WO 2014003161 A1 * | 1/2014 | | B23B 27/22 |

* cited by examiner

CUTTING INSERT HAVING A COOLANT DUCT

CLAIM TO PRIORITY

This application is a National entry application of German Application No. 102012111576.1, filed on Nov. 29, 2012, the entire contents of which is incorporated herein by reference.

FIELD OF THE INVENTION

The invention relates to a cutting insert. Moreover, the invention relates to a cutting tool having a tool holder and a cutting insert.

BACKGROUND OF THE INVENTION

During the cutting-off and turning of workpieces, friction and forming lead to a strong evolution of heat, as a result of which the workpiece, but also the cutting tool used, is greatly heated. However, the high temperatures of the cutting tool lead to increased wear, resulting in costs. For this reason, the cutting insert is cooled with the aid of a coolant during the machining of the workpiece. To date, it has been conventional for a stream of coolant to be guided to the cutting insert, in particular to the main lip of the cutting insert, through nozzles or ducts in or on the tool holder in which the cutting insert is mounted. This has the problem that the stream of coolant is directed to a strong extent, and therefore merely the portion of the cutting insert which is directly impacted by the stream of coolant is cooled.

SUMMARY OF THE INVENTION

It is an object of the invention to provide a cutting insert which has a small degree of wear and makes longer service lives possible.

This object is achieved by a cutting insert having a main lip, a rake face and at least one coolant duct, which is formed on the top side of the cutting insert, wherein the at least one coolant duct runs at least partially in the rake face toward the main lip and the width thereof increases toward the main lip. By virtue of the invention, the stream of coolant which emerges from a nozzle or opening in the tool holder is guided through the coolant duct in a targeted manner toward the lip. The geometry of the ducts makes it possible to conduct the stream of coolant in such a manner that lips which require cooling are cooled. Moreover, the formation of the coolant ducts on the top side of the cutting insert makes it easier to access the ducts, and therefore, during assembly, it is not necessary to tediously align the openings in the cutting insert and in the tool holder, which guide the coolant, with one another. A further advantage of the ducts formed on the top side is that the production of the cutting insert is made considerably easier compared with those having coolant ducts on the inside.

It is preferable that the coolant duct is directed toward the main lip and forms a main coolant duct, making targeted cooling of the main lip possible.

The cutting insert preferably has at least one secondary lip, wherein the coolant duct is directed toward the at least one secondary lip and forms a secondary coolant duct. The orientation of the coolant duct toward a secondary lip ensures that the secondary lip, which does not lie directly in the connection between the point at which the coolant emerges in the tool holder and the main lip, is cooled.

According to a further embodiment, the rake face has at least one chip breaker, as a result of which it is possible to influence the chip formation.

By way of example, the coolant duct is partially delimited by the at least one chip breaker, such that the latter combines the coolant-conducting function of a duct wall with the action of a chip breaker. This makes it possible to achieve a particular space-saving arrangement of chip breaker and coolant duct on the rake face.

It is preferable that the at least one chip breaker has a part oriented substantially perpendicular to the main lip and/or a part oriented obliquely to the main lip. As a result of this geometry, the chip breaker can fulfill both its function as a delimitation of the coolant duct and also its chip-breaking function.

It is particularly preferable that the secondary coolant duct is arranged on that side of the at least one chip breaker which is remote from the main lip, such that at least some of the stream of coolant is guided without problem into the secondary coolant duct through the height of the chip breaker.

In a further embodiment variant, two chip breakers are provided, the main coolant duct extending between the two chip breakers. This geometry makes it possible for some of the stream of coolant to pass directly and unhindered to the main lip.

It is preferable that two chip deflectors are provided, between which the coolant duct opens conically, as a result of which the flow of coolant is widened.

It is particularly preferable that the distance between the chip deflectors is greater than the distance between the chip breakers, such that the entire stream of coolant does not flow into the main coolant duct.

In a further embodiment, the cutting insert has two secondary lips and at least two secondary coolant ducts, and therefore the cutting tool benefits from two cooled secondary lips.

By way of example, the coolant ducts have a common portion, which makes it significantly easier to feed the coolant into the various coolant ducts.

In one configuration of the invention, the at least one coolant duct is tub-shaped, and therefore the coolant experiences the smallest possible flow resistance.

In a further embodiment variant of the invention, the cutting insert is intended for a turning tool.

The invention also relates to a cutting tool having a tool holder and a cutting insert. Here, the cutting insert is inserted into a recess in the tool holder, the coolant duct being defined at least partially between the surface of the cutting insert and a surface of the recess in the tool holder. The assembly of a cutting insert in the tool holder is thereby made easier and can be carried out without additional alignment steps. In the case of the tool holder according to the invention there are a total of at least three positions for the lever tool. Along with the insertion portion which enables the insertion of the lever tool, it is possible to push out the groove insert directly in a direction proceeding from the insertion portion by the ejector portion pushing directly against the groove insert in order to release it from the support. The expanding portion proceeds from the insertion portion in the opposite direction, the slot tapering in this case. When the ejector continuation is moved out of the insertion portion into the expanding portion or when it is moved along the expanding portion, the ejector continuation presses against the bottom surface of the clamping jaw in order to pivot up said clamping jaw. The tool holder according to the invention consequently allows for either the groove insert to be pushed out directly or, as an alternative to this, the clamping jaw to be raised.

BRIEF DESCRIPTION OF THE DRAWINGS

Further features and advantages of the invention become apparent from the following description and from the accompanying drawings, to which reference is made. In the drawings.

DETAILED DESCRIPTION OF THE INVENTION

Figure 1:
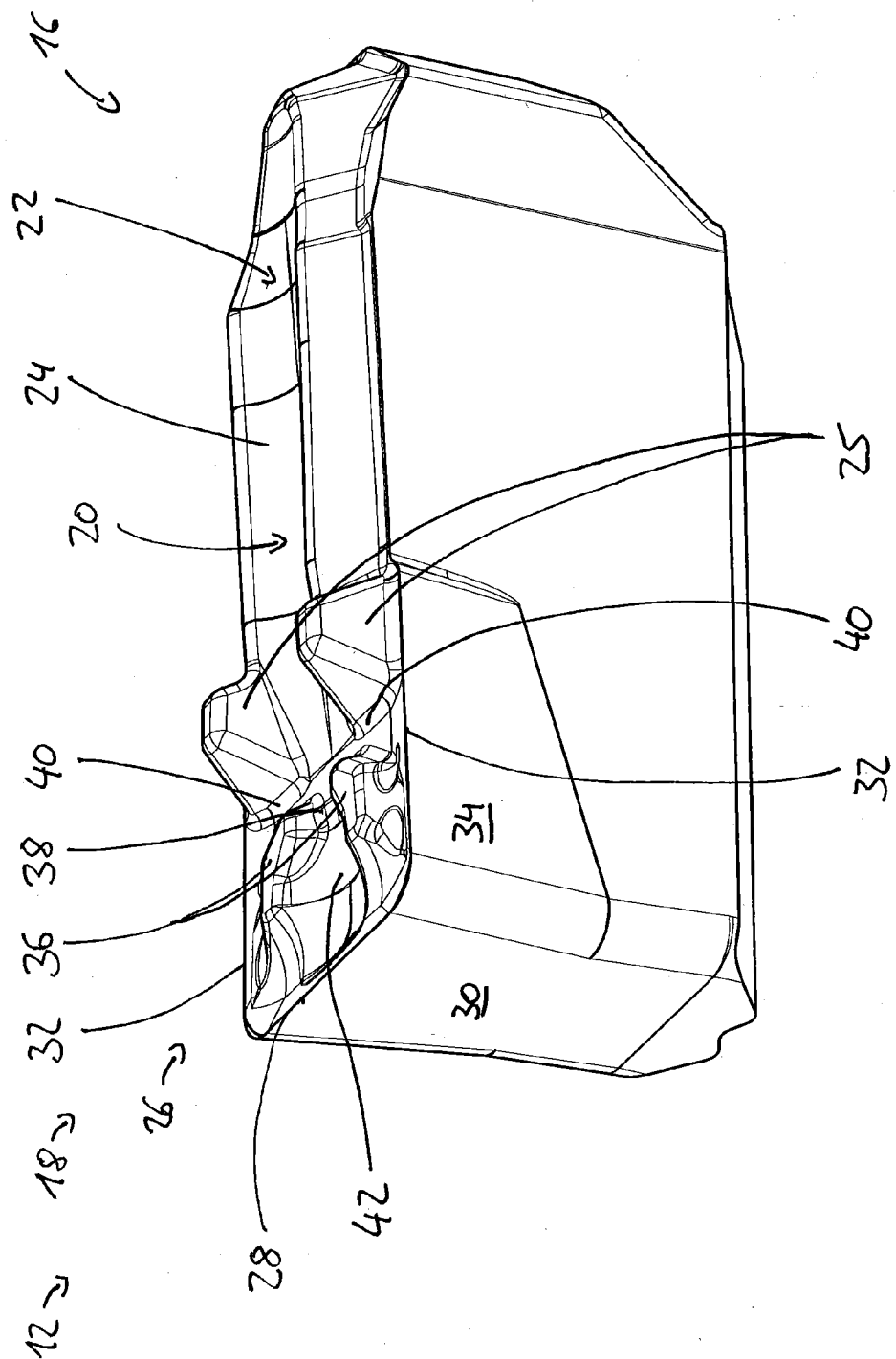
FIG. 1 shows a perspective view of the cutting insert according to the invention.
Figure 2:
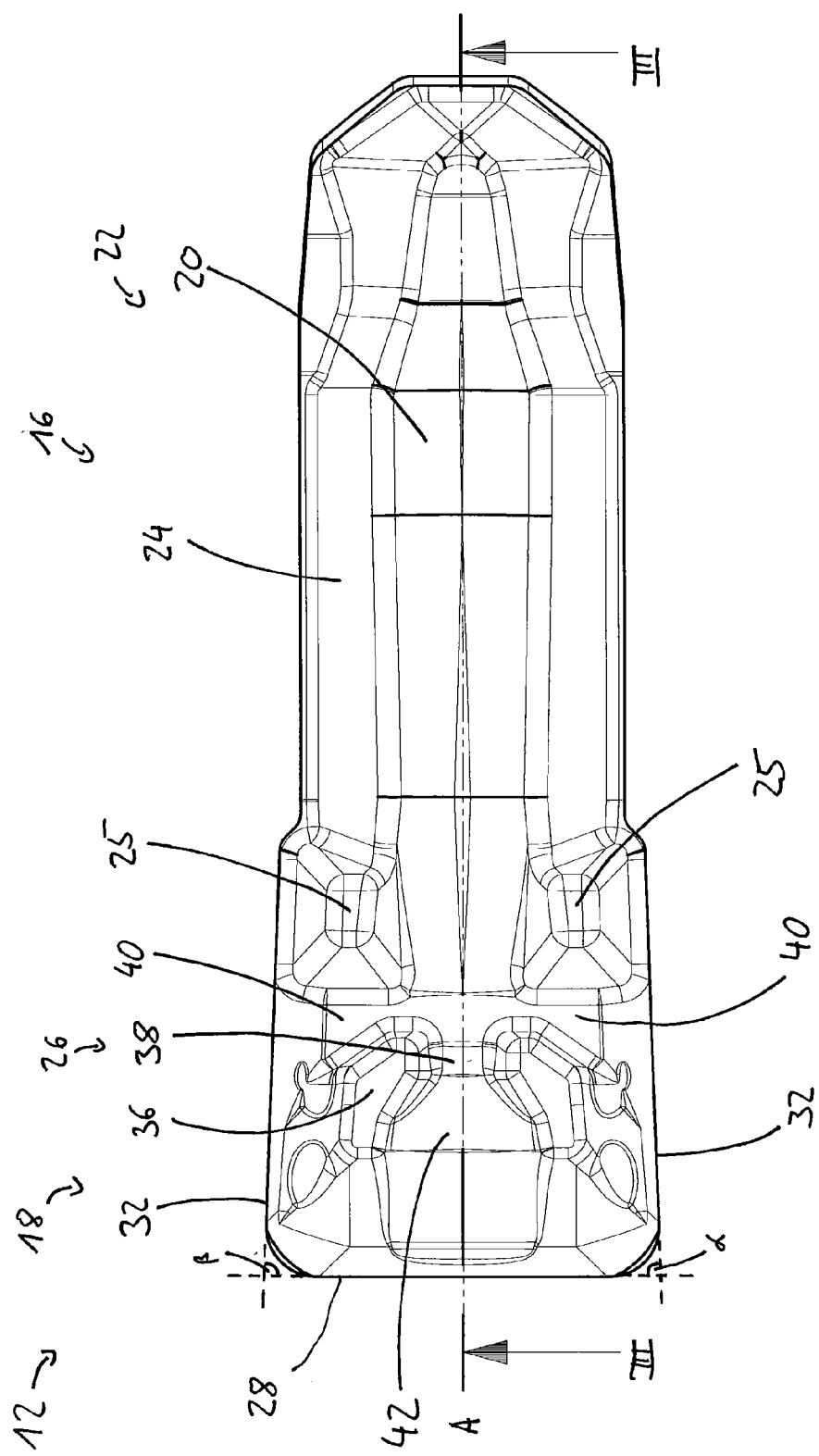
FIG. 2 shows a plan view of the cutting insert shown in FIG. 1.
Figure 3:
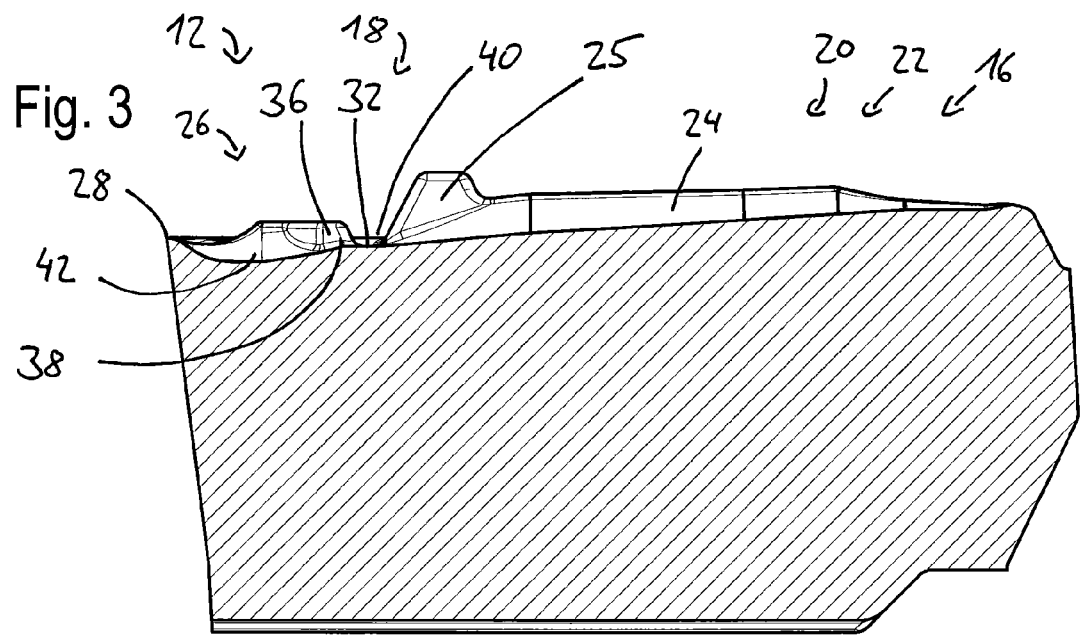
FIG. 3 shows a section through the cutting insert according to the invention along the plane III-III.

FIGS. 1 to 3 show a cutting insert 12 intended for a cutting tool 10. Here, the cutting insert 12 can be divided into two regions: an insertion region 16 for mounting the cutting insert in the cutting tool 10 and a cutting region 18, with which the workpiece to be machined (not shown) can be machined.

A coolant duct 20 extends virtually over the entire length of the cutting insert 12. An inlet region 22 of the coolant duct 20 is located in the insertion region 16 and runs along a central axis A of the cutting insert 12. The inlet region 22 is surrounded by a U-shaped duct wall 24, which is open toward the cutting region 18.

On that side of the cutting region 18 which faces toward the insertion region 16, the duct wall 24 forms, at the ends of the legs of its U shape, chip deflectors 25, between which the coolant duct 20 extends and opens conically in this region. The surface of the cutting region 18 is configured as a rake face 26 and forms lips at the intersection with the circumferential faces of the cutting insert 12. A main lip 28 is formed at the edge of the rake face 26 with the end face 30 of the cutting insert 12. Two secondary lips 32 are formed by the rake face 26 and in each case one of the opposing side faces 34. The main lip 28 forms approximately a right angle with each of the two secondary lips 32. However, the internal angles α, β between the main lip 28 and in each case one of the secondary lips 32 are preferably smaller than 90°.

The rake face 26 has two chip breakers 36, which divide the rake face 26 into three ducts. The distance perpendicular to the central axis A between the chip breakers 36 is in this case smaller than that between the chip deflectors 25. A main coolant duct 38 extends between the two chip breakers 36 along the central axis A. Proceeding obliquely from the central axis A, secondary coolant ducts 40 extend in the direction of the secondary lips 32 in front of the chip breakers 36. These are delimited in each case at least partially by a chip deflector 25 and a chip breaker 36.

The main coolant duct 38 is configured as a tub-shaped depression 42 at least between the chip breakers 36 and here is delimited partially by parts of the chip breakers 36 which are oriented perpendicularly to the main lip. Thereafter, the main coolant duct 38 rises rapidly toward the main lip 28 and ends as soon as the base thereof has reached the level of the main lip 28.

Each of the secondary coolant ducts 40 runs toward a secondary lip 32 at an angle. Proceeding from the central axis A, the secondary coolant ducts 40 widen in the direction of the secondary lips 32. This is achieved by parts of the chip breakers 36, which delimit the secondary coolant ducts 40, oriented obliquely to the main lip 28. In a manner similar to the main coolant duct 38, the secondary coolant ducts 40 rise slightly before they reach the respective secondary lips 32, until the base thereof has reached the level of the secondary lips 32.

Figure 4:
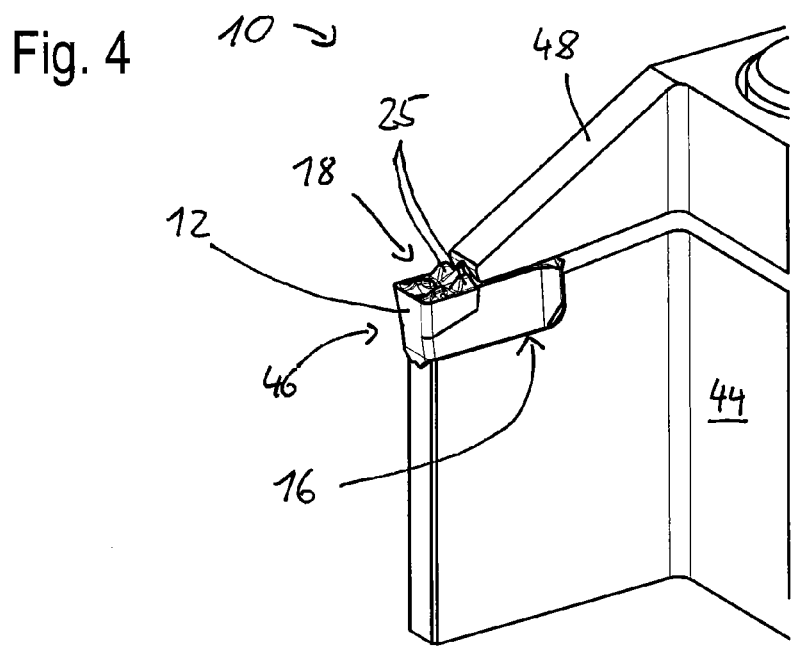
FIG. 4 shows the cutting insert as shown in FIG. 1 inserted in a tool holder.

FIG. 4 shows sections of a cutting tool 10, consisting of the cutting insert 12, which has been inserted into a tool holder 44. For this purpose, the tool holder has a recess 46, which is delimited toward the top by a nose 48. A nozzle (not shown), which can also be configured as a duct or bore, is formed inside the tool holder 44 and opens out into the recess 46.

For assembly, the cutting insert 12 is introduced into the recess 46 in the tool holder 44. The insertion region 16 of the cutting insert 12 is then located completely in the recess 46, the cutting region 18 protruding in front of the nose 48. Here, the bottom side of the nose 48 of the tool holder 44, together with the duct wall 24, forms the inlet region 22 of the coolant duct 20. The nozzle then opens out into the inlet region 22.

For cooling the cutting insert 12, coolant flows out of the nozzle into the inlet region 22 of the coolant duct 20. The coolant then passes through the opening between the chip deflectors 25 and consequently impinges on the chip breakers 36. Since the opening between the chip breakers 36 is smaller than the opening between the chip deflectors 25, the stream of coolant is split into three at this point. The quantity of coolant which passes through the opening between the chip breakers 36 is guided by the main coolant duct 38 to the main lip 28, and can accordingly cool the main lip 28.

As seen in the direction of flow along the central axis A, the rest of the coolant is conducted by the chip breakers 36 to the left or right into the secondary coolant ducts 40, through which the coolant passes to the secondary lips 32 and cools the latter. All three lips of the cutting insert 12 are therefore cooled in a targeted manner.

What is claimed is:

1. A cutting insert comprising a main lip, a rake face and a coolant duct formed on a top side of the cutting insert, wherein the coolant duct runs at least partially in the rake face toward the main lip, and wherein the rake face has two chip breakers and two chip deflectors, and wherein the coolant duct extends between the two chip breakers and opens conically between the two chip deflectors.

2. The cutting insert according to claim 1, wherein the coolant duct extending between the two chip breakers forms a main coolant duct.

3. The cutting insert according to claim 1, wherein the cutting insert has at least one secondary lip, wherein the coolant duct is directed toward the at least one secondary lip and forms a secondary coolant duct.

4. The cutting insert according to claim 1, wherein the coolant duct is partially delimited by the at least one chip breaker.

5. The cutting insert according to claim 1, wherein the two chip breakers have a part oriented substantially perpendicular to the main lip or oriented obliquely to the main lip.

6. The cutting insert according to claim 3, wherein the secondary coolant duct is arranged on a side of one of the two chip breakers which is remote from the main lip.

7. The cutting insert according to claim 1, wherein a distance between the two chip deflectors is greater than a distance between the two chip breakers.

8. The cutting insert according to claim 3, wherein the cutting insert has two secondary lips and at least two secondary coolant ducts.

9. The cutting insert according to claim 8, wherein the two secondary coolant ducts have a common portion.

10. The cutting insert according to claim 2, wherein the main coolant duct is configured as a tub-shaped depression.

11. The cutting insert according to claim 1, wherein the cutting insert is intended for a turning tool.

12. A cutting tool having a tool holder and a cutting insert according to claim 1, wherein the cutting insert is inserted into a recess in the tool holder, the coolant duct being defined at least partially between the top surface of the cutting insert and a surface of the recess in the tool holder.

13. A cutting insert comprising an insertion region for mounting the cutting insert in a cutting tool and a cutting region for machining a workpiece, a coolant duct located in the insertion region and extending along a central axis of the cutting insert, a pair of chip deflectors at one end of the insertion region proximate the cutting region, and a pair of chip breakers located in the cutting region that divides the coolant duct into a main coolant duct for directing coolant to a main lip and a pair of secondary coolant ducts for directing coolant to a pair of secondary lips formed at an angle of approximately 90 degrees with respect to the main lip, wherein the coolant duct opens conically between the chip deflectors.

14. The cutting insert according to claim 13, wherein an internal angle between the main lip and each of the secondary lips is less than 90 degrees.

15. The cutting insert according to claim 13, wherein a distance perpendicular to the central axis between the two chip breakers is less than a distance perpendicular to the central axis between the two chip deflectors.

16. The cutting insert according to claim 13, wherein the main coolant duct is configured as a tub-shaped depression.

17. The cutting insert according to claim 13, wherein the main coolant duct rises in elevation in a direction of the main lip.

18. The cutting insert according to claim 13, wherein the secondary coolant ducts are formed at an oblique angle with respect to the central axis of the cutting insert.

19. The cutting insert according to claim 13, wherein a width of the secondary coolant ducts increase in a direction of the secondary lips.

20. The cutting insert according to claim 13, wherein the secondary coolant ducts rise in elevation in a direction of the secondary lips.

\* \* \* \* \*